US012695608B2

(12) United States Patent (10) Patent No.: US 12,695,608 B2
Davidson et al. (45) Date of Patent: Jul. 28, 2026

(54) ENCRYPTED IO USER CONNECTIONS BETWEEN IO USERS AND STORAGE VOLUMES

(71) Applicant: Dell Products L.P., Round Rock, TX (US)

(72) Inventors: Michal Sara Davidson, Beit Shemesh, IL (US); Shoham Levy, Ra'anana, IL (US)

(73) Assignee: Dell Products L.P., Round Rock, TX (US)

( * ) Notice: Subject to any disclaimer, the term of this patent is extended or adjusted under 35 U.S.C. 154(b) by 161 days.

(21) Appl. No.: 18/099,042

(22) Filed: Jan. 19, 2023

(65) Prior Publication Data

US 2024/0250814 A1 Jul. 25, 2024

(51) Int. Cl.
*H04L 9/08* (2006.01)
*G06F 13/20* (2006.01)

(52) U.S. Cl.
CPC .............. *H04L 9/088* (2013.01); *G06F 13/20* (2013.01)

(58) Field of Classification Search
CPC ......... H04L 9/088; H04L 9/0891; H04L 9/30; H04L 12/40104; H04L 63/0428; G06F 13/20; G06F 2211/008; G06F 2211/007; G06F 21/6209; G06F 2212/402
USPC ........................................ 713/190
See application file for complete search history.

(56) References Cited

U.S. PATENT DOCUMENTS

| | | | | |
|---|---|---|---|---|
| 10,936,522 B1* | 3/2021 | Iqbal | ................... | G06F 13/1668 |
| 11,563,555 B2* | 1/2023 | Rangayyan | ........... | G06F 21/606 |
| 2002/0138670 A1* | 9/2002 | Johnson | ............... | G06F 3/0659 |
| | | | | 710/6 |
| 2011/0072225 A1* | 3/2011 | Kawaguchi | ........... | G06F 3/0685 |
| | | | | 711/170 |
| 2017/0163607 A1* | 6/2017 | Skuratovich | .......... | H04L 63/061 |
| 2019/0075183 A1* | 3/2019 | Silberkasten | ......... | H04L 67/145 |
| 2019/0340136 A1* | 11/2019 | Irwin | .................... | G06F 3/0608 |
| 2020/0021651 A1* | 1/2020 | Nallathambi | ....... | G06F 11/1451 |
| 2021/0081544 A1* | 3/2021 | Borlick | ............... | G06F 12/1408 |

(Continued)

OTHER PUBLICATIONS

"Selecting the Right Encryption Approach for your Organization"; https://cpl.thalesgroup.com/encryption/selecting-right-encryption-approach; downloaded on Jan. 10, 2023.

(Continued)

*Primary Examiner* — Kaylee J Huang

(74) *Attorney, Agent, or Firm* — Ryan, Mason & Lewis, LLP

(57) ABSTRACT

Techniques are provided for encrypting IO (input/output) operations between IO users and storage volumes. One method comprises obtaining IO user context information associated with an established IO user connection between a processor-based IO user and at least a portion of a storage volume on a storage array, wherein the IO user context information comprises one or more keys for the established IO user connection; encrypting a payload of a given IO operation using at least one of the one or more keys; and transmitting the encrypted payload and at least a portion of the IO user context information over the established IO user connection, wherein the processor-based IO user and/or the storage array decrypt the encrypted payload using at least one of the one or more keys.

20 Claims, 12 Drawing Sheets

(56) References Cited

U.S. PATENT DOCUMENTS

2021/0173945  A1*    6/2021   Karr ........................ G06F 3/065

OTHER PUBLICATIONS

White, Emma; "Must-Know Best Practices for Amazon EBS Encryption"; AWS Compute Blog on Jul. 15, 2020; https://aws.amazon.com/blogs/compute/must-know-best-practices-for-amazon-ebs-encryption/; downloaded on Jan. 10, 2023.

How to Encrypt Actual Storage/Volume Being Used by Kubernetes Pods Using Client Managed Keys (ILeast/Zero Knowledge of Keys on the Provider Side)? https://stackoverflow.com/questions/63156913/how-to-encrypt-actual-storage-volume-being-used-by-kubernetes-pods-using-client; downloaded on Jan. 10, 2023.

\* cited by examiner

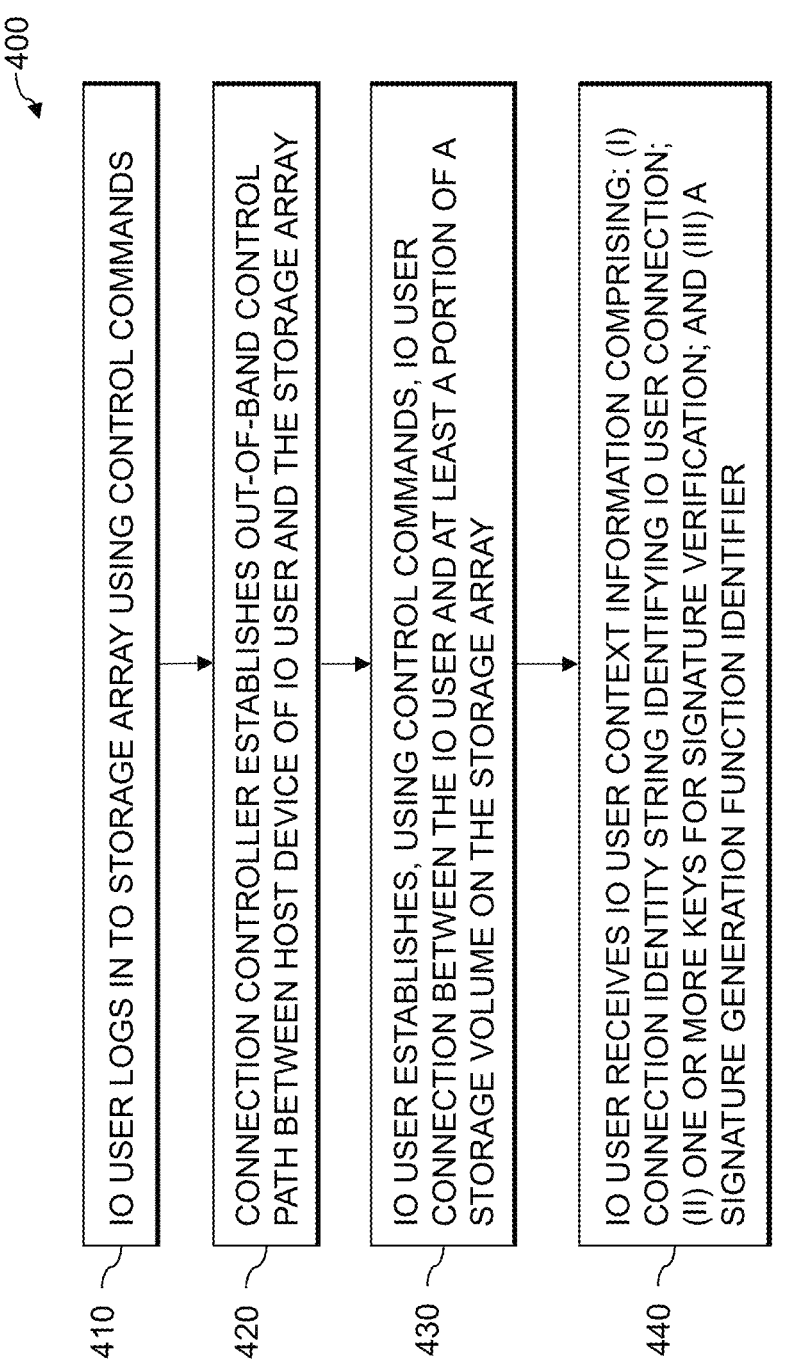

400

410 — IO USER LOGS IN TO STORAGE ARRAY USING CONTROL COMMANDS

420 — CONNECTION CONTROLLER ESTABLISHES OUT-OF-BAND CONTROL PATH BETWEEN HOST DEVICE OF IO USER AND THE STORAGE ARRAY

430 — IO USER ESTABLISHES, USING CONTROL COMMANDS, IO USER CONNECTION BETWEEN THE IO USER AND AT LEAST A PORTION OF A STORAGE VOLUME ON THE STORAGE ARRAY

440 — IO USER RECEIVES IO USER CONTEXT INFORMATION COMPRISING: (I) CONNECTION IDENTITY STRING IDENTIFYING IO USER CONNECTION; (II) ONE OR MORE KEYS FOR SIGNATURE VERIFICATION; AND (III) A SIGNATURE GENERATION FUNCTION IDENTIFIER

| IO USER | STORAGE VOLUME / AREA | CONNECTION HOST DEVICE | CONNECTION IDENTITY STRING | IO USER MAC KEY | STORAGE ARRAY MAC KEY | MAC FUNCTION |
|---|---|---|---|---|---|---|
| sqldb | 0x44h5ad40 / 0 - 100.000 | SERVER-1 | 8f12dc4909680e4f8 7438919c0793fe9 | QY3RNUF 5 | BHYJSQ8L | HMAC |
| sqldb | 0x44h5ad40 / 100,001 – END (DIFFERENT VOLUME AREAS, SAME APP) | SERVER-1 | d48123a0e0dbb9b4 c5e7b5f94710fc03 | P3CINT0K | A05ADC2I | HMAC |
| sqldb | 0x44h5ad40 / 0 - 100.000 (DIFFERENT HOST, SAME VOLUME, SAME APP) | SERVER-2 | f6f319566922461d8 1a81620628c74c5 | R9739ELQ | T7KV7SCY | OMAC |
| Videoeditor | 0xaa367d98 | SERVER-2 | bc63d2a99731531b c949bfb322819aab | HO0HIZAK | OMJM8QB 2 | UMAC- VMAC |

FIG. 5

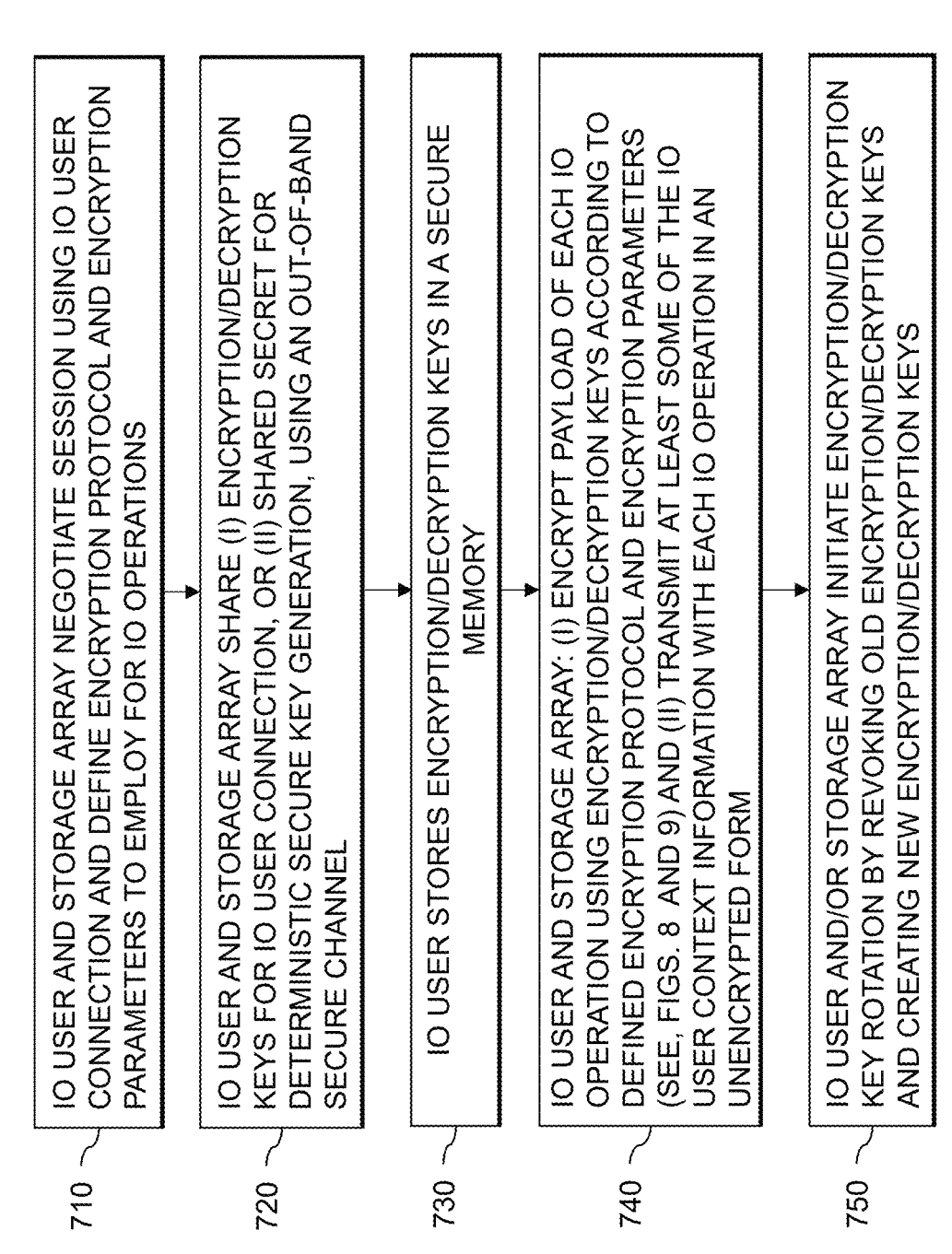

700

710 — IO USER AND STORAGE ARRAY NEGOTIATE SESSION USING IO USER CONNECTION AND DEFINE ENCRYPTION PROTOCOL AND ENCRYPTION PARAMETERS TO EMPLOY FOR IO OPERATIONS

720 — IO USER AND STORAGE ARRAY SHARE (I) ENCRYPTION/DECRYPTION KEYS FOR IO USER CONNECTION, OR (II) SHARED SECRET FOR DETERMINISTIC SECURE KEY GENERATION, USING AN OUT-OF-BAND SECURE CHANNEL

730 — IO USER STORES ENCRYPTION/DECRYPTION KEYS IN A SECURE MEMORY

740 — IO USER AND STORAGE ARRAY: (I) ENCRYPT PAYLOAD OF EACH IO OPERATION USING ENCRYPTION/DECRYPTION KEYS ACCORDING TO DEFINED ENCRYPTION PROTOCOL AND ENCRYPTION PARAMETERS (SEE, FIGS. 8 AND 9) AND (II) TRANSMIT AT LEAST SOME OF THE IO USER CONTEXT INFORMATION WITH EACH IO OPERATION IN AN UNENCRYPTED FORM

750 — IO USER AND/OR STORAGE ARRAY INITIATE ENCRYPTION/DECRYPTION KEY ROTATION BY REVOKING OLD ENCRYPTION/DECRYPTION KEYS AND CREATING NEW ENCRYPTION/DECRYPTION KEYS

FIG. 7

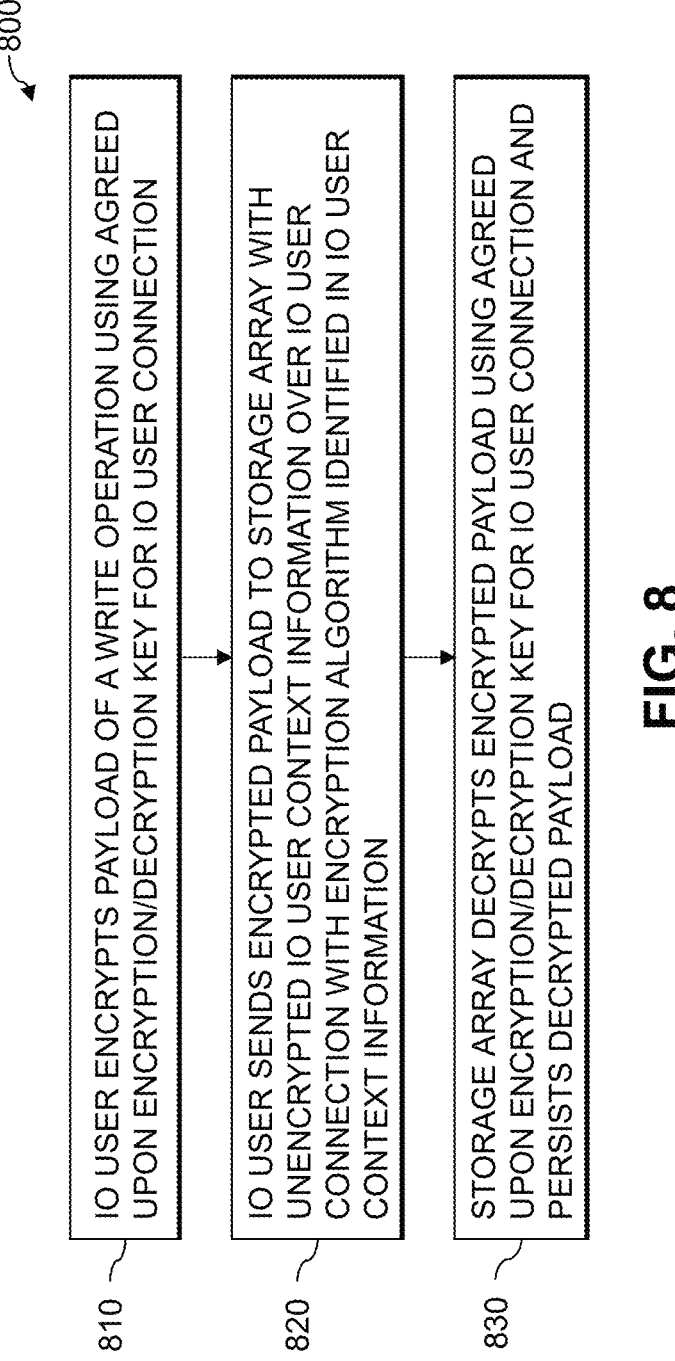

800

810 — IO USER ENCRYPTS PAYLOAD OF A WRITE OPERATION USING AGREED UPON ENCRYPTION/DECRYPTION KEY FOR IO USER CONNECTION

820 — IO USER SENDS ENCRYPTED PAYLOAD TO STORAGE ARRAY WITH UNENCRYPTED IO USER CONTEXT INFORMATION OVER IO USER CONNECTION WITH ENCRYPTION ALGORITHM IDENTIFIED IN IO USER CONTEXT INFORMATION

830 — STORAGE ARRAY DECRYPTS ENCRYPTED PAYLOAD USING AGREED UPON ENCRYPTION/DECRYPTION KEY FOR IO USER CONNECTION AND PERSISTS DECRYPTED PAYLOAD

FIG. 8

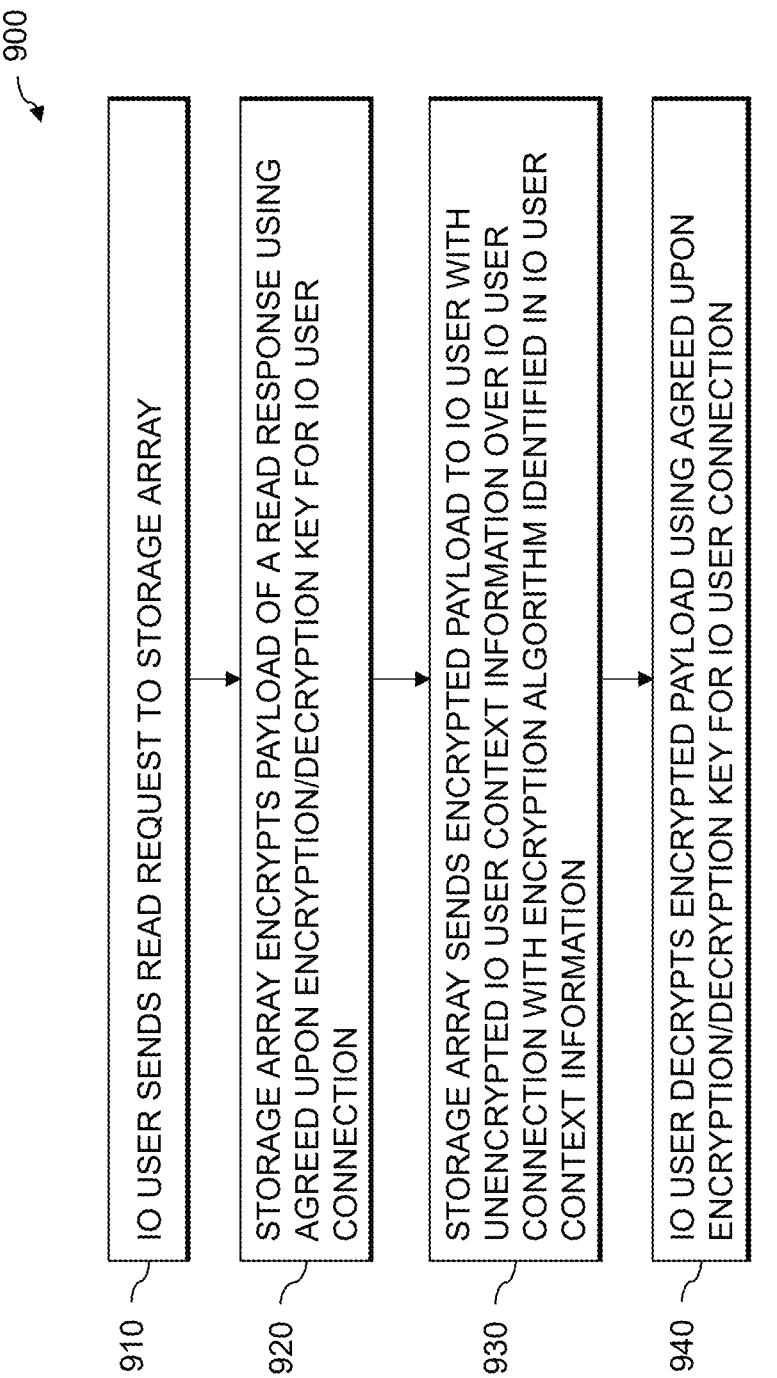

910   IO USER SENDS READ REQUEST TO STORAGE ARRAY

920   STORAGE ARRAY ENCRYPTS PAYLOAD OF A READ RESPONSE USING AGREED UPON ENCRYPTION/DECRYPTION KEY FOR IO USER CONNECTION

930   STORAGE ARRAY SENDS ENCRYPTED PAYLOAD TO IO USER WITH UNENCRYPTED IO USER CONTEXT INFORMATION OVER IO USER CONNECTION WITH ENCRYPTION ALGORITHM IDENTIFIED IN IO USER CONTEXT INFORMATION

940   IO USER DECRYPTS ENCRYPTED PAYLOAD USING AGREED UPON ENCRYPTION/DECRYPTION KEY FOR IO USER CONNECTION

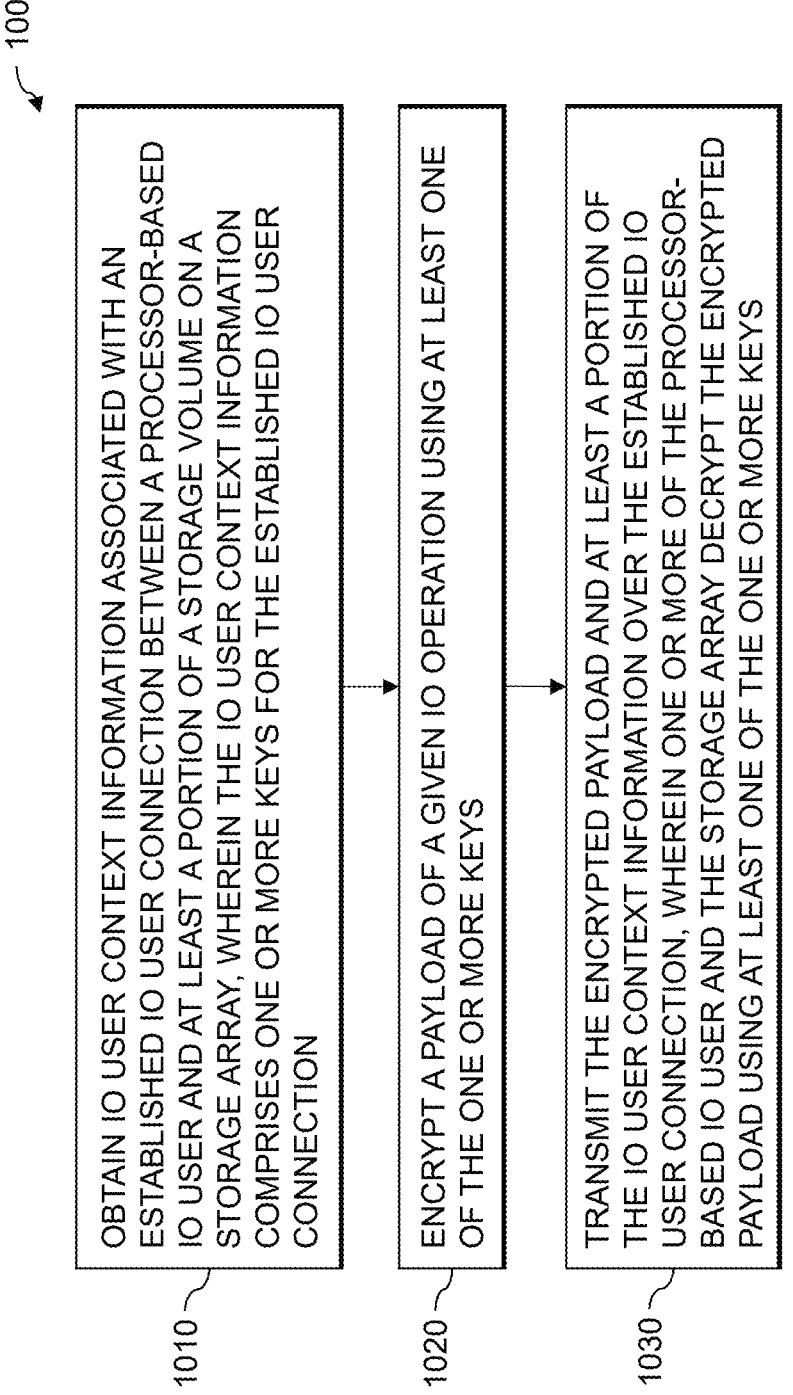

1000

1010 — OBTAIN IO USER CONTEXT INFORMATION ASSOCIATED WITH AN ESTABLISHED IO USER CONNECTION BETWEEN A PROCESSOR-BASED IO USER AND AT LEAST A PORTION OF A STORAGE VOLUME ON A STORAGE ARRAY, WHEREIN THE IO USER CONTEXT INFORMATION COMPRISES ONE OR MORE KEYS FOR THE ESTABLISHED IO USER CONNECTION

1020 — ENCRYPT A PAYLOAD OF A GIVEN IO OPERATION USING AT LEAST ONE OF THE ONE OR MORE KEYS

1030 — TRANSMIT THE ENCRYPTED PAYLOAD AND AT LEAST A PORTION OF THE IO USER CONTEXT INFORMATION OVER THE ESTABLISHED IO USER CONNECTION, WHEREIN ONE OR MORE OF THE PROCESSOR-BASED IO USER AND THE STORAGE ARRAY DECRYPT THE ENCRYPTED PAYLOAD USING AT LEAST ONE OF THE ONE OR MORE KEYS

FIG. 10

ENCRYPTED IO USER CONNECTIONS BETWEEN IO USERS AND STORAGE VOLUMES

FIELD

The field relates generally to information processing systems, and more particularly to communications in such systems.

BACKGROUND

A host device often executes multiple applications at the same time, with a single connection between a given host device (and the one or more applications executed by the given host device) and a storage volume. Once a storage volume is accessible to the given host device, the applications executed by the given host device have access to the storage volume. Thus, access to a storage volume is protected for each host device and the storage array comprising the storage volume is only aware of host devices using the storage volume (and not the one or more applications executed by such host devices).

A need exists for improved techniques for securing IO (input/output) operations between different IO users and storage volumes.

SUMMARY

In one embodiment, a method comprises obtaining IO user context information associated with an established IO user connection between a processor-based IO user and at least a portion of a storage volume on a storage array, wherein the IO user context information comprises one or more keys for the established IO user connection; encrypting a payload of a given IO operation using at least one of the one or more keys; and transmitting the encrypted payload and at least a portion of the IO user context information over the established IO user connection, wherein one or more of the processor-based IO user and the storage array decrypt the encrypted payload using at least one of the one or more keys.

In one or more embodiments, an establishing of the IO user connection may comprise defining an encryption protocol for the IO user connection. The establishing of the IO user connection may comprise the processor-based IO user and the storage array sharing one or more of: (i) the one or more keys and (ii) a shared secret for generation of the one or more keys.

In some embodiments, the processor-based IO user comprises one or more of an application, an application acting on behalf of another user, an operating system of a host device, at least one processing device and a virtualized computing resource. When the processor-based IO user comprises an application, one or more wrapper libraries may perform a decryption function for read operations and/or an encryption function for write operations of the application over the IO user connection.

In at least one embodiment, the processor-based IO user may send at least one read request to the storage array, wherein the storage array: (i) encrypts a payload of a read response to the at least one read request using an encryption key for the established IO user connection, and (ii) sends the encrypted payload and at least a portion of the IO user context information over the established IO user connection to the processor-based IO user, and wherein the processor-based IO user decrypts the encrypted payload using a decryption key for the established IO user connection. The processor-based IO user may send at least one write operation to the storage array, wherein the processor-based IO user: (i) encrypts a payload of the at least one write operation using an encryption key for the established IO user connection, and (ii) sends the encrypted payload and at least a portion of the IO user context information over the established IO user connection to the storage array, and wherein the storage array decrypts the encrypted payload using a decryption key for the established IO user connection and stores the decrypted payload.

Other illustrative embodiments include, without limitation, apparatus, systems, methods and computer program products comprising processor-readable storage media.

BRIEF DESCRIPTION OF THE DRAWINGS

FIG. 4 is a flow diagram illustrating an exemplary implementation of a process for creating IO user connections between IO users and storage volumes of a storage system, according to one embodiment of the disclosure;

FIG. 5 is a sample table for storing IO user context information associated with a number of different IO user connections, according to one exemplary embodiment;

FIG. 7 is a flow diagram illustrating an exemplary implementation of a method for negotiating sessions between an IO user and a storage array over an IO user connection, according to one embodiment of the disclosure;

FIG. 8 is a flow diagram illustrating an exemplary implementation of a method for processing write operations over encrypted IO user connections, according to one embodiment of the disclosure;

FIG. 9 is a flow diagram illustrating an exemplary implementation of a method for processing read operations over encrypted IO user connections, according to one embodiment of the disclosure;

FIG. 10 is a flow diagram illustrating an exemplary implementation of a process for encrypting IO operations between IO users and storage volumes, according to one exemplary embodiment of the disclosure;

DETAILED DESCRIPTION

Figure 1:
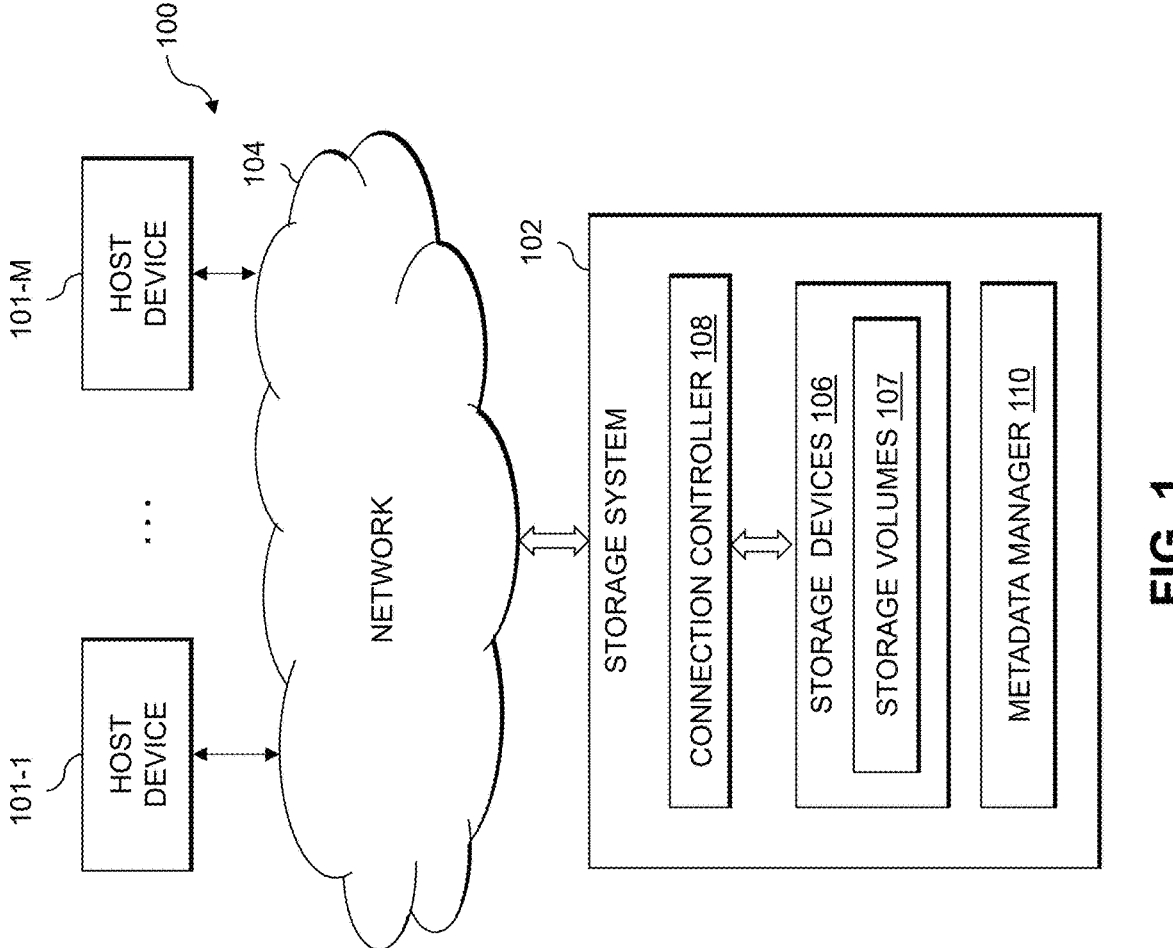
FIG. 1 illustrates an information processing system configured for encrypting IO operations between IO users and storage volumes in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for encrypting IO operations between IO users and storage volumes.

In one or more embodiments, techniques are provided for encrypting IO operations between IO users and storage volumes. In at least some embodiments, the disclosed IO user connection encryption techniques define IO users with a storage array and associate each IO operation (e.g., read and write operations) with a corresponding IO user.

In at least one embodiment, the disclosed IO user connection encryption techniques allow for IO user-level features, such as IO user-level inflight data encryption, as opposed to the host-level features associated with current storage systems. Currently, the same host-level volume connection is used for encrypting data inflight, such that all data written to the storage volume, for a given host device, by any application, is treated in a similar manner. The disclosed IO user-level features allow IO users to define their own storage properties, regardless of the host device, including IO user-level inflight data encryption.

For example, end-to-end (e.g., inflight) encryption may be established from a given IO user, such as an application executing on a host device, to a storage array, thereby protecting the data of the IO user from operating system-level vulnerabilities. As used herein, the term processor-based IO user shall be broadly construed to encompass any processor-based user defined on a storage array for the purpose of generating IO operations related to storage volumes in an IO user-aware manner. As used herein, the term IO path shall be broadly construed to encompass any connection (e.g., SCSI (Small Computer System Interface), NVMe (NVM Express or Non-Volatile Memory Host Controller Interface Specification), and/or a Storage Data Client (SDC)) used to transmit IO operations between a processor-based IO user and at least a portion of a storage volume.

In some embodiments, the processor-based IO user can represent, for example, an application, an application acting on behalf of another user, an operating system of a host device, at least one processing device and/or a virtualized computing resource (e.g., a container or virtual machine) that generates one or more IO operations. In an implementation where the processor-based IO user is a container, the Kubernetes CNI (container network interface) layer, or a pod sidecar, may be employed to implement pod-specific and/or container-specific inflight data encryption, in a transparent manner to the application running inside the pod. In an implementation where the processor-based IO user is an application, the same application can have multiple IO user identities, each with a different IO user connection and different encryption/decryption keys (for example, in a multi-tenancy environment).

In one or more embodiments, a protocol is provided for IO user-to-storage-array direct access, allowing for in-flight encryption of data, separately for each processor-based IO user. For a more detailed discussion of techniques for establishing IO user connections between IO users and storage volumes, see, U.S. patent application Ser. No. 18/099,036, filed contemporaneously herewith, entitled "Signature-Based IO User Connections Between IO Users and Storage Volumes," (now U.S. Pat. No. 12,210,745) incorporated by reference herein in its entirety.

FIG. 1 shows an information processing system 100 configured in accordance with an illustrative embodiment. The information processing system 100 comprises a plurality of host devices 101-1 through 101-M, collectively referred to herein as host devices 101 (e.g., host servers).

The host devices 101 are configured to communicate with a storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate IO operations that are processed by the storage system 102. The term "input/output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of a cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106, one or more connection controllers 108 and a metadata manager 110. In at least some embodiments, each connection controller 108 is unique to a host device 101 and establishes different secure IO user connections between IO users of the corresponding host device 101 and storage volumes 107 of the storage system 102 (or portions of such storage volumes 107), using the disclosed IO user connection encryption techniques. The metadata manager 110 may be implemented, for example, as a software object that manages the storage system 102. The metadata manager 110 may implement at least some of the disclosed functionality for IO user connection encryption, as discussed further below in conjunction with, for example, FIG. 5.

The storage devices 106 store data of a plurality of storage volumes 107. For example, the storage volumes 107 may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device (e.g., a LUN) which can span multiple physical volumes. The term "storage volume" as used herein is intended to be broadly construed, and shall encompass, for example, a virtual disk, other units of data storage, a logical storage volume, and a namespace, and should not be viewed as being limited to any particular format or configuration.

The storage devices 106 of the storage system 102 illustratively comprise solid state drives (SSDs). Such SSDs are implemented using NVM devices such as flash memory. Other types of NVM devices that can be used to implement at least a portion of the storage devices include non-volatile random-access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in the storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives, storage appliances or other types of storage devices.

In some embodiments, the storage system 102 illustratively comprises a scale-out all-flash distributed content addressable storage (CAS) system, such as a storage array.

A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input/output (MPIO) driver configured to control delivery of IO operations from the host device to the storage system 102 over selected ones of a plurality of paths through the network 104. The MPIO driver may comprise, for example, an otherwise conventional MPIO driver. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

In some embodiments, the storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller of the storage system 102. For example, in some embodiments the sets of processing modules of the storage nodes collectively comprise a distributed storage controller of the storage system 102. A "distributed storage system" as that term is broadly used herein is intended to encompass any storage system that is distributed across multiple storage nodes.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As
indicated previously, the host devices 101 may be imple-
mented in whole or in part on the same processing platform
as the storage system 102, or on a separate processing
platform.

The term "processing platform" as used herein is intended
to be broadly construed so as to encompass, by way of
illustration and without limitation, multiple sets of process-
ing devices and associated storage systems that are config-
ured to communicate over one or more networks. For
example, distributed implementations of the system 100 are
possible, in which certain components of the system reside
in one data center in a first geographic location while other
components of the system reside in one or more other data
centers in one or more other geographic locations that are
potentially remote from the first geographic location. Thus,
it is possible in some implementations of the system 100 for
the host devices 101 and the storage system 102 to reside in
different data centers.

Additional examples of processing platforms utilized to
implement host devices 101 and storage system 102 in
illustrative embodiments will be described in more detail
below in conjunction with FIGS. 11 and 12.

It is to be appreciated that these and other features of
illustrative embodiments are presented by way of example
only, and should not be construed as limiting in any way. For
example, the particular sets of modules and other compo-
nents implemented in the system 100 as illustrated in FIG.
1 are presented by way of example only. In other embodi-
ments, only subsets of these components, or additional or
alternative sets of components, may be used, and such
components may exhibit alternative functionality and con-
figurations.

Accordingly, different numbers, types and arrangements
of system components such as host devices 101, storage
system 102, and network 104 can be used in other embodi-
ments.

It should be understood that the particular sets of com-
ponents implemented in the system 100 as illustrated in FIG.
1 are presented by way of example only. In other embodi-
ments, only subsets of these components, or additional or
alternative sets of components, may be used, and such
components may exhibit alternative functionality and con-
figurations.

Figure 2:
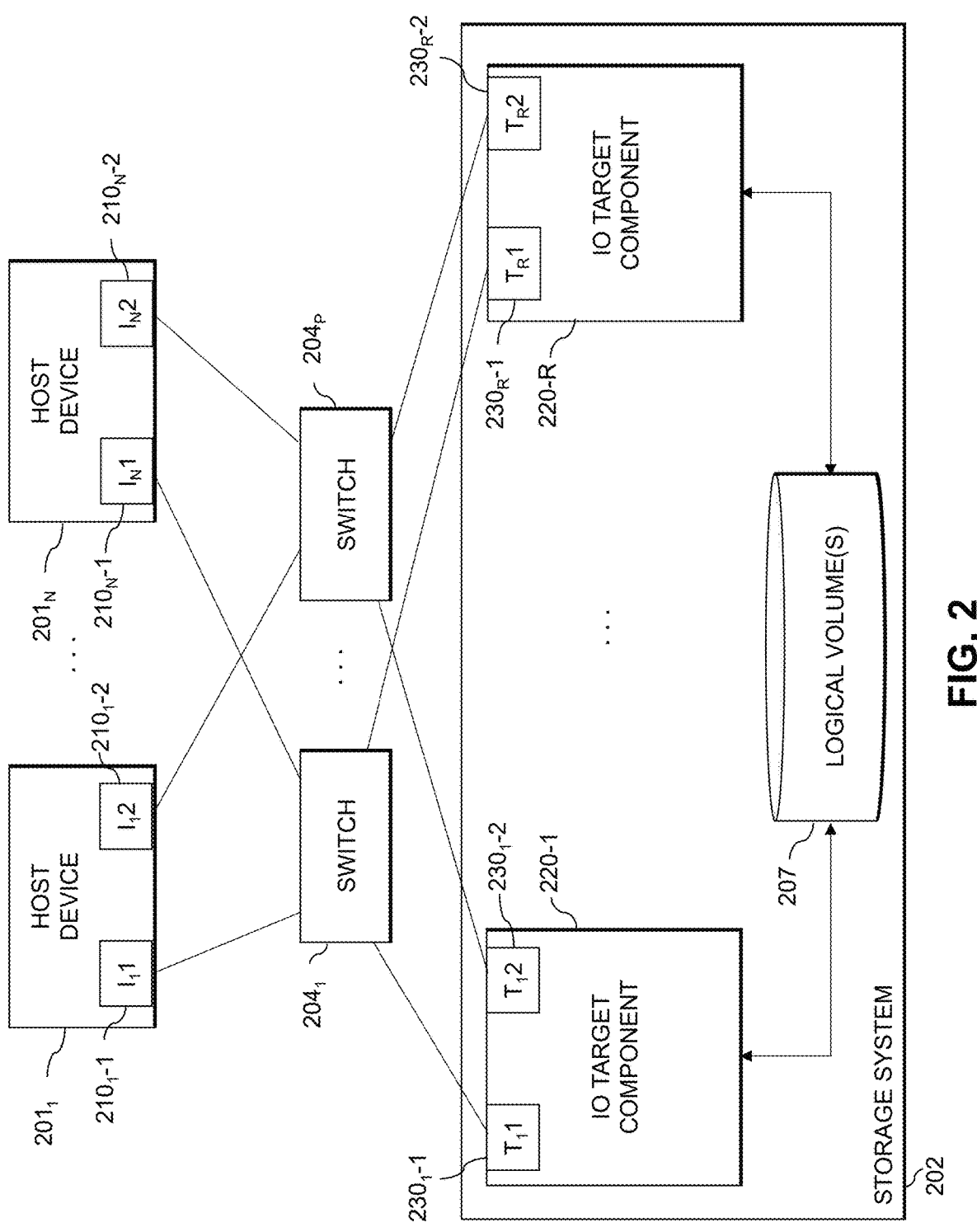
FIG. 2 is a block diagram illustrating switches that connect between host devices and components of the storage system of FIG. 1 in one illustrative embodiment.

FIG. 2 is a block diagram illustrating switches 204₁
through 204_P that connect between host devices 201₁
through 201_N and IO target components 220-1 through
220-R (e.g., storage data targets) of a storage system 202 in
one or more illustrative embodiments.

Each of the host devices 201 illustratively has one or more
IO paths to the storage system 202 using one or more of the
switches 204₁ through 204_P, with at least one of the storage
devices 106 of the storage system 202 being visible to that
host device 201 on a given one of the paths. A given one of
the storage devices 106 (e.g., logical volumes 207) may be
accessible to the given host device 201 over one or more IO
paths.

In illustrative embodiments, with reference to the
example of FIG. 2, each of the host devices 201₁ through
201_N comprises one or more initiator ports 210, e.g., initiator
ports 210₁-1, 210₁-2, 210_N-1 and 210_N-2, also sometimes
referred to herein a host interfaces, which are utilized to
communicate with the storage system 202 via one or more
switches 204₁ through 204_P. In some embodiments, the
initiator ports 210 are referred to as initiators for the IO
paths. For example, the initiator port 210₁-1 of host device
201₁ may be referred to as initiator 1 ($I_1$1) and the initiator port 210₁-2 of host device 201₁ may be referred to as
initiator 2 ($I_1$2). Initiator ports 210 may comprise any
circuitry that is configured to enable communication
between the host devices 201 and the storage system 202 or
any other devices.

In addition, with continued reference to the example of
FIG. 2, each of the IO target components 220-1 through
220-R provides IO target functionality and comprises one or
more target ports 230, e.g., target ports 230₁-1, 230₁-2,
230_R-1 and 230_R-2, also sometimes referred to herein a
storage system interfaces, which are utilized to communi-
cate with one or more host devices 201 via the one or more
switches 204₁ through 204_P. In some embodiments, the
target ports 230 are referred to as targets for the IO paths. For
example, the target port 230₁-1 of IO target component
220-1 may be referred to as target 1 ($T_1$1) and the target port
230₁-2 of IO target component 220-1 may be referred to as
target 2 ($T_1$2). Target ports 230 may comprise any circuitry
that is configured to enable communication between the host
devices 201 and the storage system 202 or any other devices.

In the example of FIG. 2, each IO target component 220
is associated with (e.g., serves) one or more target ports 230
and therefore the selection of a target port 230 also selects
the IO target component 220 associated with the selected
target port 230.

Figure 3:
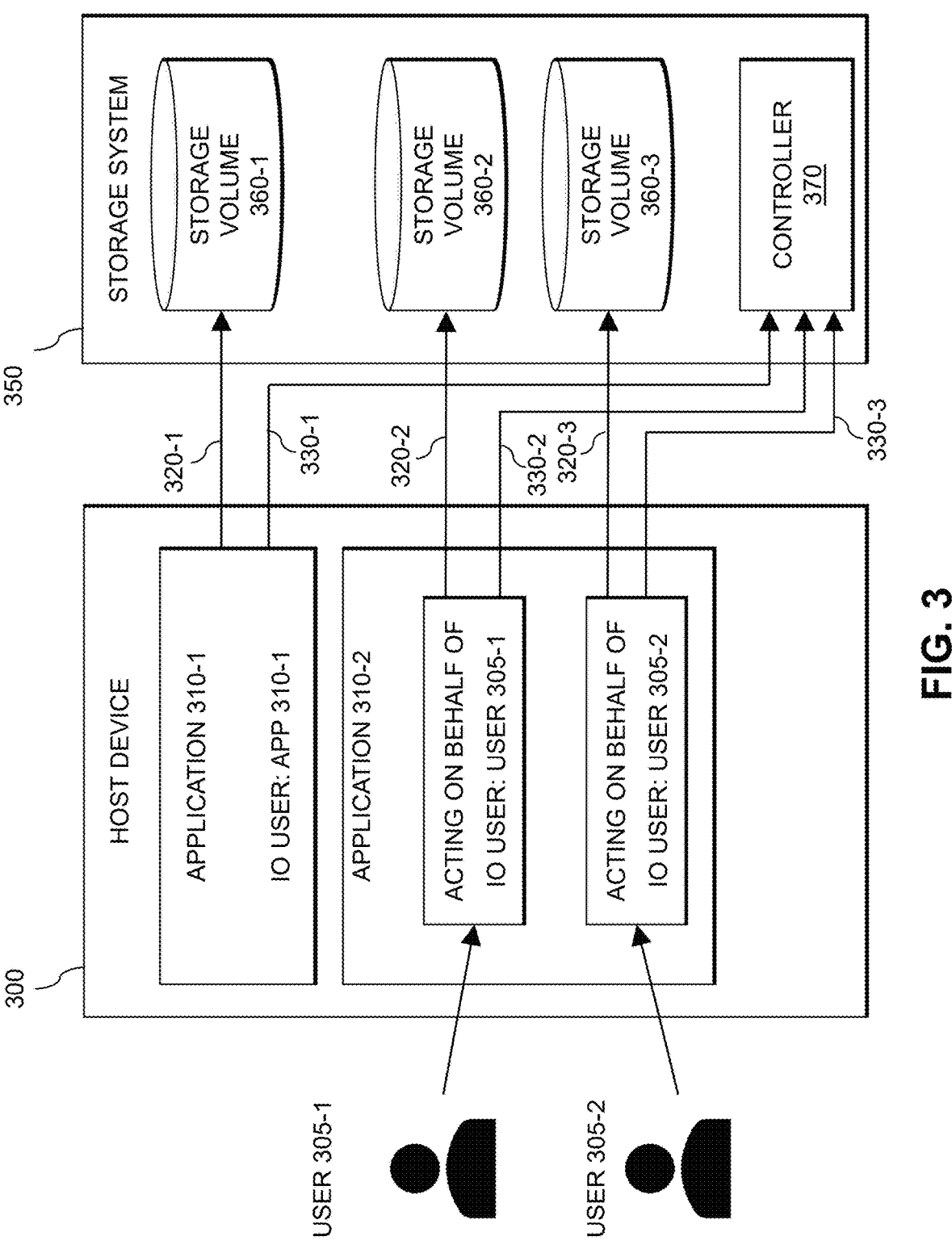
FIG. 3 is a block diagram illustrating a creation of IO user connections between IO users and storage volumes of a storage system, according to one embodiment of the disclosure.

FIG. 3 is a block diagram illustrating a creation of IO user
connections between IO users associated with host devices,
such as a host device 300, and at least portions of one or
more storage volumes 360 of a storage system 350, accord-
ing to one embodiment of the disclosure. In the example of
FIG. 3, a first application 310-1 establishes a first IO user
connection 320-1 between the application 310-1 and at least
a portion of a storage volume 360-1. The IO user associated
with the IO user connection 320-1 is the first application
310-1 itself.

A second application 310-2 establishes a second IO user
connection 320-2 between the second application 310-2
acting on behalf of a human user 305-1 and at least a portion
of a second storage volume 360-2. In some embodiments,
the IO user associated with the IO user connection 320-2 can
be considered the human user 305-1. In addition, the second
application 310-2 establishes a third IO user connection
320-3 between the second application 310-2 acting on behalf
of a different human user 305-2 and at least a portion of a
third storage volume 360-3. The IO user associated with the
IO user connection 320-3 can be considered the human user
305-2 in some embodiments.

In at least some embodiments, the IO user connections
320-1 through 320-3 comprise data paths between a given
IO user and a respective portion of the storage volume. In
addition, each IO user has a control path 330-1 through
330-3 between each respective IO user and a controller 370
(e.g., connection controller 108) of the storage system 350.

FIG. 4 is a flow diagram illustrating an exemplary imple-
mentation of a process 400 for creating IO user connections
between IO users and storage volumes of a storage system,
according to one embodiment of the disclosure. The process
400 is performed to prepare a storage array to receive IO
user-specific connections between IO users and at least
portions of storage volumes, in accordance with the dis-
closed IO user connection encryption techniques.

In the example of FIG. 4, an IO user initially logs in to a
storage array using one or more control commands in step
410. The login of the IO user in step 410 can be performed
in any secure way, such as using a username/password pair,
asymmetric keypairs and/or certificates. In at least some
embodiments, IO users are predefined on the storage array.

Such IO users, and their permissions, may be configured in advance by a storage array administrator. An application, or an application acting on behalf of another user, for example, can use one or more such IO users to send control commands to the storage array. The same IO user may also be used to identify IO operations.

In step 420, a connection controller, such as the connection controller 108, establishes an out-of-band control path between a given host device of the IO user and the storage array. It is assumed that an IO path between the given host device of the IO user and the storage array already exists. There are a number of methods to define and establish IO paths between host devices and storage arrays, and any transport mechanism can be used such as: a fiber channel, a TCP (Transmission Control Protocol) connection, or a mesh network.

The IO user establishes, using control commands on the out-of-band control path, an IO user connection in step 430 between the IO user and at least a portion of a storage volume on the storage array.

In step 440, the IO user receives IO user context information comprising, for example: (i) connection identity string identifying the established IO user connection; (ii) one or more keys for signature verification; and (iii) a signature generation function identifier (such as hash-based MAC, one-key MAC, universal hash-based MAC, or an asymmetric signature, such as an RSA asymmetric signature or an Elliptic Curve Digital Signature Algorithm (ECDSA) asymmetric signature, for example). The IO user connection attributes that need to be negotiated in step 430 may include:

a storage volume (and/or a storage volume area, with a starting logical block address (LBA) and an ending LBA;

a connection identity string identifying the IO user connection;

one or more keys, such as symmetric MAC (message authentication code) keys or asymmetric signature keys, so that the IO user and the storage array can validate each other's signature on IO operations. For example, a first MAC key may be used for the host device to sign read operations, and a second MAC key may be used for the IO user to sign write operations. Signature keys often have a length in a range of 128 to 2048 bits, depending on the signature function and security level. In this manner, IO operations may be verified by evaluating MAC codes, for example, on each IO message; and a MAC function (to generate the MAC signature hash value).

In one or more embodiments, the IO user should keep sensitive IO user connection information, such as the MAC keys, in a secure memory location, such as a secure enclave. In this manner, memory snooping attacks from other applications or the operating system of the host device are prevented.

An IO user may define multiple IO user connections for the same storage volume, for the same or different storage volume sections, and from the same or different hosts. For example, multiple instances of a DBMS (database management system) may use the same IO user to create connections to the same IO user-aware storage volume from multiple host devices. Each such IO user connection may have a unique connection identity string. In addition, the same application may create multiple IO user-aware storage volume connections, each for a different user of a given application, for example.

In some embodiments, when IO user connection attributes are changed by the IO user, a new IO user connection can be created, and a new connection identity string can be generated. This connection identity string can then be used to differentiate between IOs that precede and succeed the change. Depending on the changed attributes, old connection identity strings can continue to be valid until explicitly canceled by the IO user using out-of-band control commands, or until some predefined time passed. For instance, if the compression method was changed, the old connection identity string and attributes may be still valid in the storage array for 30 seconds (e.g., to properly handle write operations that suffer network latency and/or disconnections).

As used herein, the term "in-band IO operation" shall be broadly construed to encompass IO operations, such as read and write operations, for a given protocol that are sent through the IO path. Likewise, the term "out-of-band control command" shall be broadly construed to encompass commands that control the flow of the in-band IO operations.

Once the IO user connection has been established using the process 400, there are different ways to implement in-band IO operations, such as:

enhancements to existing block storage protocols (e.g., adding new protocol metadata fields or reusing existing protocol metadata fields for each IO operation);

appending or prepending the IO payload with predefined metadata; and/or defining a new block storage protocol.

There are also different ways to implement out-of-band control commands, such as:

adding, reusing and/or enhancing existing block storage protocol control commands;

defining special IO payloads that will be interpreted as control operations by the storage array and IO user; and/or using a different connection to the storage array, other than the IO path, such as a REST API to the controller of the storage array.

FIG. 5 is a sample table 500 for storing IO user context information associated with a number of different IO user connections, according to one exemplary embodiment. Among other benefits, the sample table 500 maps connection identity strings to corresponding IO users. The sample table 500 comprises IO user context information that can be added to in-band IO operations directed to an IO user-aware storage volume. The IO user context information in the sample table 500 of FIG. 5 comprises the following fields for each IO user connection: IO user identifier; storage volume identifier (or a portion thereof); host device identifier; connection identity string; IO user MAC key; storage array MAC key; and MAC function.

The MAC keys (or other signature keys) of the IO user and the storage array may be determined for each session, in at least some embodiments. The MAC keys may be stored, for example, in a secure memory and be 128 bits long, and are used to generate a signature for the payload and the IO user context information. In at least some embodiments, the MAC function is applied to the payload and the IO user context information fields (other than the MAC fields). The storage array will sign the payload for read operations and the IO user will sign the payload for write operations.

The connection identity string may be, for example, a 128-byte long UUID (universally unique identifier). The connection identity string may be used to identify the IO user connection. The presence of the connection identity string can be used to differentiate between regular IO operations and IO user-aware IO operations when the protocol is implemented as part of the IO payload. One or more additional fields may optionally be added to the IO user context information for additional features on top of the IO user-aware storage volumes, such as per-IO metadata and/or in-flight encryption.

A timestamp (e.g., a duration since an epoch in milliseconds), such as a 64-bit unsigned integer may be added to each IO operation for additional validation, and to detect anomalous IO operations, such as IO operations associated with replay attacks.

Figures 6A, 6B, 6C:
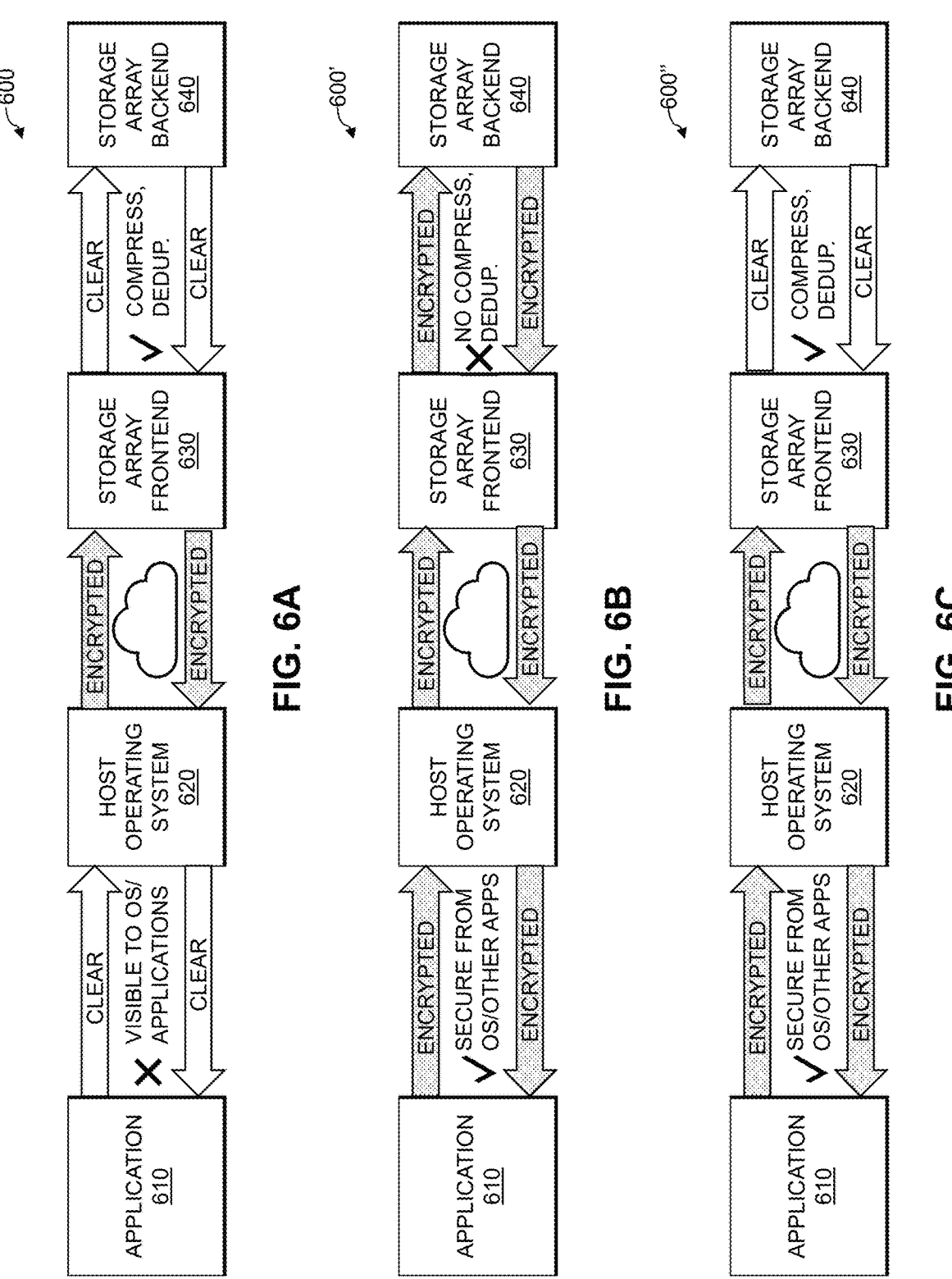
FIGS. 6A, 6B and 6C illustrate techniques for encrypting IO operations between an IO user and a storage array, according to various embodiments.

FIGS. 6A, 6B and 6C illustrate techniques 600, 600', 600" for encrypting IO operations between an IO user, such as an application 610, and a storage array, according to various embodiments. In the example of FIG. 6A, a technique 600 is shown for encrypting IO operations at the operating system level between a host operating system 620 of a host device and a storage array frontend 630 of a storage array. The same encryption is applied to all IOs between the host operating system 620 and the storage array frontend 630, regardless of the originating application 610. Thus, for write operations, the IO data is sent in an unencrypted form (e.g., in the clear) from the application 610 to the host operating system 620, and thus is reliant on the security of the host operating system 620. The unencrypted data sent to the host operating system 620 is thus visible to the operating system and to other applications. The host operating system 620 sends encrypted data to the storage array frontend 630, which decrypts the encrypted data using a host-level decryption key. Thus, the data is also sent in an unencrypted form from the storage array frontend 630 to the storage array backend 640. In this manner, the storage system can perform storage operations on the unencrypted data, such as compression and deduplication.

Similarly, for read operations, the IO data associated with the read response is sent in an unencrypted form from the storage array backend 640 to the storage array frontend 630. The storage array frontend 630 encrypts the data for transmission to the host operating system 620, which decrypts the encrypted data using a host-level decryption key. Thus, the data is also sent in an unencrypted form from the host operating system 620 to the application 610.

It is often desirable to let applications 610 protect their data when it is transmitted to/from the storage array in a manner that prevents other applications and the host operating system 620 from eavesdropping on the encrypted data.

In the example of FIG. 6B, a technique 600' is shown for an application 610 to encrypt IO operations, in a manner that is transparent to the storage target (e.g., garbage in garbage out (GIGO)). The encrypted data sent by the application 610 to the host operating system 620 is thus secure with respect to the operating system, other applications and the storage array. When the application reads the encrypted data from the storage array, the encrypted data is only decrypted by the application 610 once returned to the application 610. The disadvantage of the application-level encryption/decryption approach of FIG. 6B is that storage capabilities, such as compression and deduplication, are disabled since the storage array gets encrypted data that cannot be compressed nor deduplicated.

In the example of FIG. 6C, a technique 600" is shown for an application 610 to encrypt IO operations, in a manner that permits the storage array to perform such storage capabilities (e.g., compression and/or deduplication). In this manner, the encryption performed by the application 610 is only in transit to the storage array and when the encrypted data reaches the storage array, the storage array can decrypt the encrypted data so that the storage array can take advantage of the advanced storage capabilities (e.g., compression and/or deduplication).

For write operations, the IO data is encrypted by the application 610 using an IO user-level encryption key that is specific to the IO user connection between the application 610 and the storage array and the encrypted IO data is sent by the application 610 in an encrypted form to the host operating system 620. The encrypted data sent to the host operating system 620 is sent by the host operating system 620 to the storage array frontend 630, which decrypts the encrypted data using an IO user-level decryption key. Thus, the data is sent in an unencrypted form from the storage array frontend 630 to the storage array backend 640. In this manner, the storage system can perform storage operations on the unencrypted data, such as compression and deduplication.

Similarly, for read operations, the IO data associated with the read response is sent in an unencrypted form from the storage array backend 640 to the storage array frontend 630. The storage array frontend 630 encrypts the data for transmission to the host operating system 620, which forwards the encrypted data to the application 610 for decryption. In this manner, the data is secure with respect to other applications on the host device and the host operating system 620 and the storage array can perform storage operations on the unencrypted data, such as compression and deduplication.

FIG. 7 is a flow diagram illustrating an exemplary implementation of a method 700 for negotiating sessions between an IO user and a storage array over an IO user-specific connection, according to one embodiment of the disclosure. As part of the IO user connection encryption session negotiation in step 710, using an established IO user connection between the IO user and at least a portion of the storage array, the IO user and the storage array define an encryption protocol and, optionally, one or more encryption parameters to use for encryption of IO operations. The employed encryption algorithm can be fixed or negotiated between the IO user and the storage target during the creation of the IO user connection. The IO user connection between the IO user and the storage target can be used to transfer the encryption session configuration information between the IO user and the storage target using a secure in-band channel, for example.

In step 720, the IO user and the storage array share (i) one or more encryption/decryption keys for the IO user connection, or (ii) a shared secret for deterministic secure key generation by the IO user and the storage array. For example, symmetric encryption/decryption keys may be used for the session encryption. A random number generator may be used to calculate session encryption/decryption keys of a defined key size. In some embodiments, a deterministic key calculation function may be implemented by both the IO user and the storage array using the shared secret that was shared using the out-of-band secure channel, and the connection identity string of the IO user connection, to enable a secure deterministic calculation of the session encryption/decryption keys. The encryption/decryption keys can be shared in some embodiments using an out-of-band secure channel. The IO user may store the session encryption/decryption keys in a secure memory location in step 730, such as a secure enclave.

Thereafter, in step 740 the payload of each IO operation can be encrypted according to the defined encryption protocol and encryption parameters, as discussed further below in conjunction with FIGS. 8 and 9, and at least some of the IO user context information is transmitted with each IO operation in an unencrypted form over an in-band IO user connection. In one or more embodiments, a standard symmetric block algorithm can be used for encrypting the data, such as AES-128-GCM-SHA256, AES-256-GCM-SHA384 or CHACHA20-Poly1305-SHA256. The encryption algorithm used may be signaled with each IO operation, for example, using the IO user context-information. A flag may be employed to signal whether the data of a particular IO operation is encrypted.

In step 750, the IO user and/or the storage array initiate a rotation of the encryption/decryption keys by revoking the old encryption/decryption keys and creating new encryption/decryption keys. The encryption/decryption keys and/or algorithms may be rotated over time in some embodiments by creating new sessions and revoking the old encryption/decryption keys. The key rotation may alternatively be performed automatically at a fixed interval or an irregular interval. For example, an asynchronous key rotation policy may be based on the asynchronous transport stream encryption techniques employed by MPEG-2 systems.

FIG. 8 is a flow diagram illustrating an exemplary implementation of a method 800 for processing write operations over encrypted IO user connections, according to one embodiment of the disclosure. Write operations may be: (i) encrypted at the IO user level and then passed in an encrypted form to the host operating system and (ii) decrypted by the storage array before being processed and persisted.

In the example of FIG. 8, an IO user encrypts a payload of a write operation in step 810 using an agreed upon encryption/decryption key for the IO user connection between the IO user and the storage array. As noted above, symmetric or asymmetric encryption techniques may be employed. In step 820, the IO user sends the encrypted payload to the storage array with unencrypted IO user context information over the IO user connection, and with the encryption algorithm identified in the IO user context information metadata.

The storage array decrypts the encrypted payload in step 830 using the agreed upon encryption/decryption key for the IO user connection and persists the decrypted payload.

Among other benefits, the encryption of write operations over the IO user connection can be used to prevent unauthorized access to storage volume data. Write operations from unauthorized IO users can be blocked (e.g., discarded) by the storage array.

FIG. 9 is a flow diagram illustrating an exemplary implementation of a method 900 for processing read operations over encrypted IO user connections, according to one embodiment of the disclosure. Read operations may be encrypted by the storage array before sending the encrypted payload to the host device and such encrypted read payloads are only decrypted when reaching the reading IO user. In this manner, the payload data is not visible during transmission, or to the host operating system of the IO user, or to another application on the host device.

In the example of FIG. 9, an IO user initially sends a read request to a storage array in step 910. In step 920, the storage array encrypts the payload of a read response using an agreed upon encryption/decryption key for the IO user connection. The storage array then sends the encrypted payload to the IO user in step 930, with the unencrypted IO user context information, over the IO user connection (and with the encryption algorithm identified in the IO user context information metadata).

In step 940, the IO user decrypts the encrypted payload using the agreed upon encryption/decryption key for the IO user connection.

The techniques of FIG. 9 may be used to prevent an unauthorized access to the storage volume data. An unauthorized IO user can only read encrypted data but the unauthorized IO user will not be able to decrypt the encrypted data without the necessary encryption/decryption keys. In this manner, the storage array can protect against unauthorized IO user read operations, regardless of the host device, using IO user-specific encryption.

FIG. 10 is a flow diagram illustrating an exemplary implementation of a process 1000 for encrypting IO operations between IO users and storage volumes, according to one exemplary embodiment. In the example of FIG. 10, the exemplary process 1000 initially obtains IO user context information associated with an established IO user connection between a processor-based IO user and at least a portion of a storage volume on a storage array in step 1010, wherein the IO user context information comprises one or more keys for the established IO user connection. In step 1020, a payload of a given IO operation is encrypted using at least one of the one or more keys. The encrypted payload and at least a portion of the IO user context information are transmitted over the established IO user connection in step 1030, wherein one or more of the processor-based IO user and the storage array decrypt the encrypted payload using at least one of the one or more keys.

In one or more embodiments, an establishing of the IO user connection may comprise defining an encryption protocol for the IO user connection. The establishing of the IO user connection may comprise the processor-based IO user and the storage array sharing one or more of: (i) the one or more keys and (ii) a shared secret for generation of the one or more keys. The processor-based IO user may store the one or more keys in a secure memory. The at least the portion of the IO user context information may be transmitted in an unencrypted form.

In some embodiments, the processor-based IO user comprises one or more of an application, an application acting on behalf of another user, an operating system of a host device, at least one processing device and a virtualized computing resource. When the processor-based IO user comprises an application, one or more wrapper libraries may perform a decryption function for read operations and/or an encryption function for write operations of the application over the IO user connection. The one or more keys may be rotated over time, for example, for improved security.

In at least one embodiment, the processor-based IO user may send at least one read request to the storage array, wherein the storage array: (i) encrypts a payload of a read response to the at least one read request using an encryption key for the IO user connection, and (ii) sends the encrypted payload and at least a portion of the IO user context information over the IO user connection to the processor-based IO user, and wherein the processor-based IO user decrypts the encrypted payload using a decryption key for the IO user connection. The processor-based IO user may send at least one write operation to the storage array, wherein the processor-based IO user: (i) encrypts a payload of the at least one write operation using an encryption key for the IO user connection, and (ii) sends the encrypted payload and at least a portion of the IO user context information over the IO user connection to the storage array, and wherein the storage array decrypts the encrypted payload using a decryption key for the IO user connection and stores the decrypted payload.

The particular processing operations and other network functionality described in conjunction with the flow diagrams of FIGS. 4 and 7 through 10 are presented by way of illustrative example only and should not be construed as limiting the scope of the disclosure in any way. Alternative embodiments can use other types of processing operations to encrypt IO operations between IO users and storage volumes. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

In some embodiments, techniques are provided for encrypting IO operations between IO users and storage volumes. In at least some embodiments, the disclosed IO user connection encryption techniques define IO users with a storage array and associate each IO operation (e.g., read/ write operations) with a corresponding IO user. The IO user can represent an application, an application acting on behalf of another user, an operating system of a host device, at least one processing device and/or a virtualized computing resource (e.g., a container or virtual machine).

The disclosed IO user connection encryption techniques encrypt IO operations between IO users and storage volumes using IO user-specific encryption/decryption keys. In one or more embodiments, a protocol is provided for IO user-to-storage-array direct access, allowing for in-flight encryption of data, separately for each IO user.

Among other benefits, the disclosed IO user connection encryption techniques allow for IO user-level encryption features. For example, end-to-end inflight encryption may be established from a given IO user, such as an application, to a storage array, thereby protecting the data of the IO user from operating system-level vulnerabilities.

One or more embodiments of the disclosure provide improved methods, apparatus and computer program products for encrypting IO operations between IO users and storage volumes. The foregoing applications and associated embodiments should be considered as illustrative only, and numerous other embodiments can be configured using the techniques disclosed herein, in a wide variety of different applications.

It should also be understood that the disclosed IO user connection encryption techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for encrypting IO operations between IO users and storage volumes may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based IO user operation encryption engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based IO user operation encryption platform in illustrative embodiments. The cloud-based systems can include block storage such as Amazon EBS (Elastic Block Store), GCP Persistent Disk, and Microsoft Azure Managed Disks.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
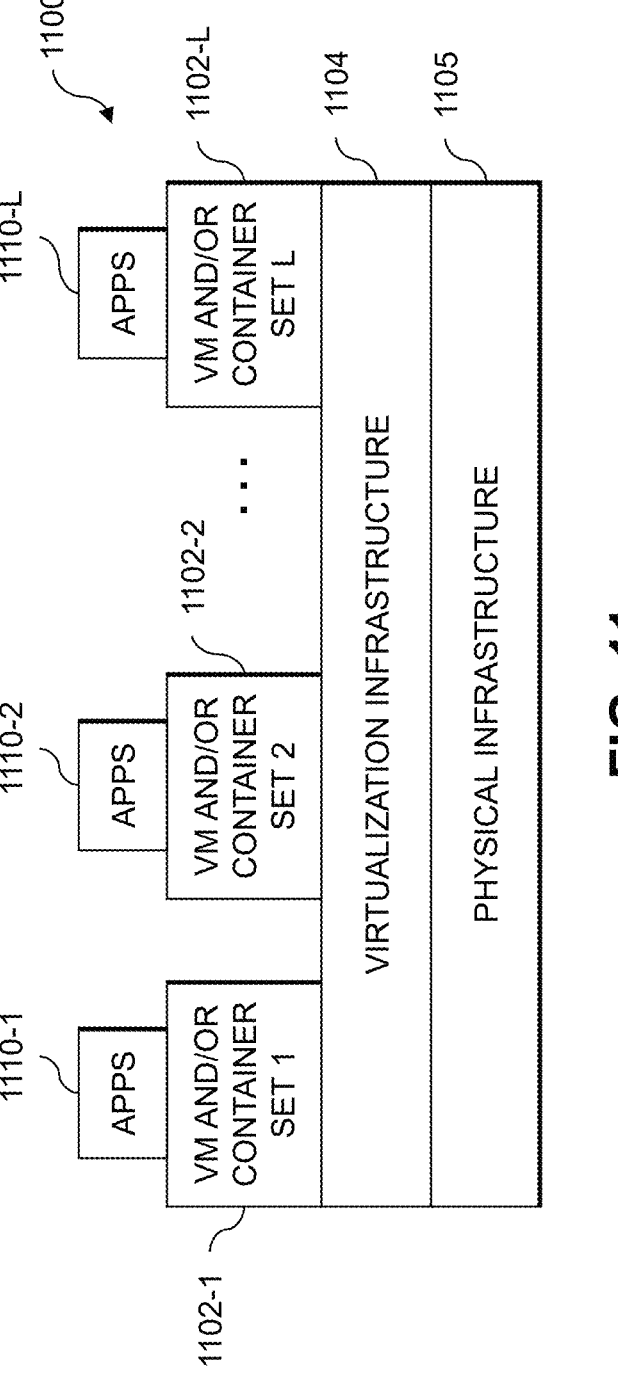
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide IO user connection encryption functionality of the type described above for one or more processes running on a given one of the VMs. For example, each of the VMs can implement IO user operation encryption control logic and associated functionality for management and processing of IOs over such encrypted IO user connections for one or more processes running on that particular VM.

An example of a hypervisor platform that may be used to implement a hypervisor within the virtualization infrastructure 1104 is a compute virtualization platform which may have an associated virtual infrastructure management system such as server management software. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide IO user connection encryption functionality of the type described above for one or more processes running on different ones of the containers. For example, a container host device supporting multiple containers of one or more container sets can implement one or more instances of IO user operation encryption control logic and associated functionality for management and processing of IOs over such encrypted IO user connections.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a WAN, a LAN, a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
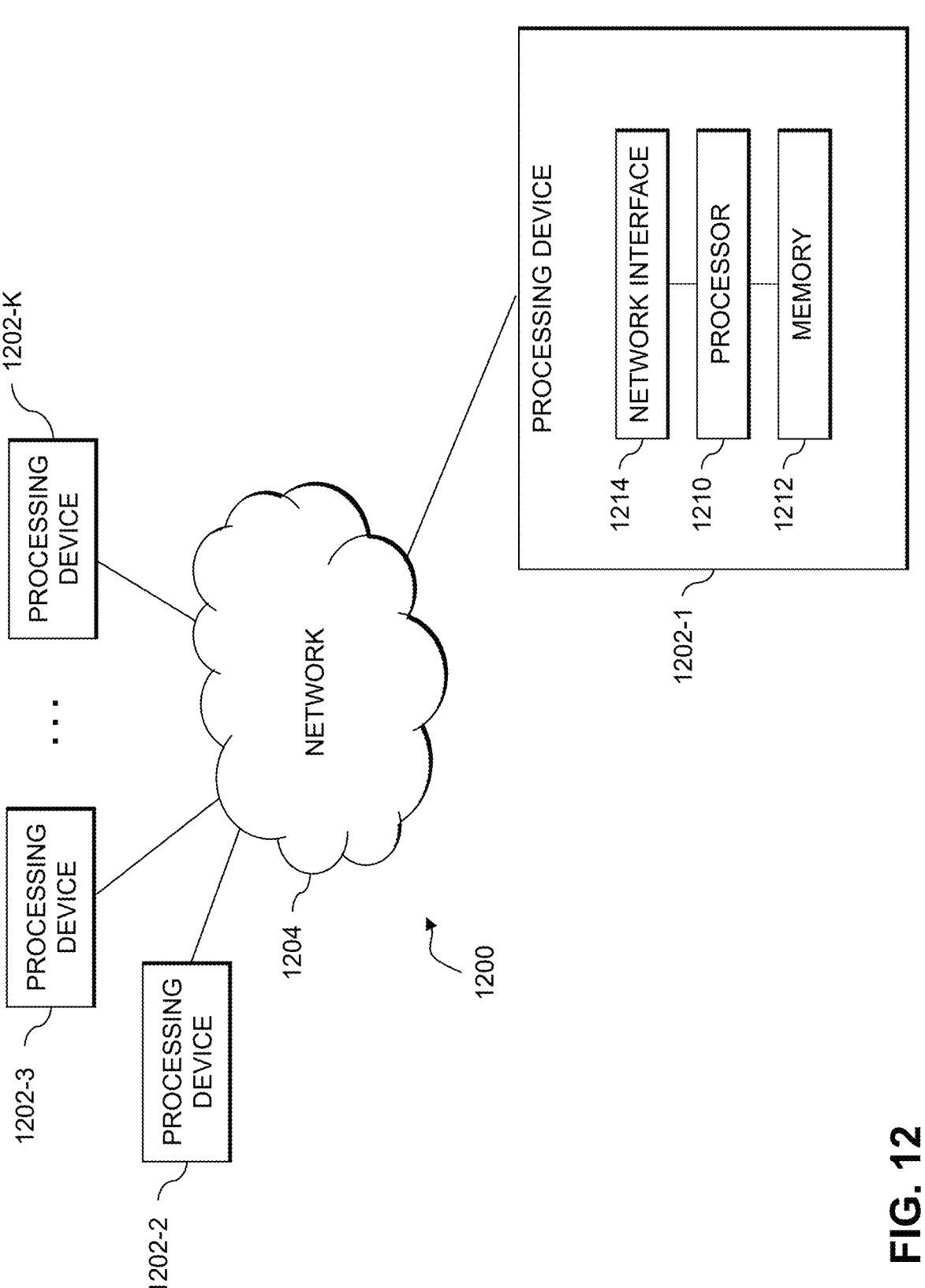
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining IO (input/output) user context information associated with an established IO user connection, of a plurality of established IO user connections, between a given processor-based IO user, of a plurality of processor-based IO users, and at least a portion of at least one storage volume on a storage array, wherein the IO user context information comprises one or more keys for the established IO user connection, wherein a host device is associated with the plurality of processor-based IO users, wherein at least two of the plurality of processor-based IO users are associated with different ones of the plurality of established IO user connections between a respective processor-based IO user and the at least the portion of the at least one respective storage volume for the respective processor-based IO user;
encrypting a payload of a given IO operation from the given processor-based IO user using at least one of the one or more keys; and
transmitting the encrypted payload and at least a portion of the IO user context information over the established IO user connection for the given processor-based IO user, wherein one or more of the given processor-based IO user and the storage array decrypt the encrypted payload using at least one of the one or more keys, wherein the given IO operation is encrypted on the established IO user connection for the given processor-based IO user between the host device and the storage array;
wherein the method is performed by at least one processing device comprising a processor coupled to a memory.

2. The method of claim 1, wherein the given processor-based IO user stores the one or more keys in a secure memory.

3. The method of claim 1, wherein an establishing of the IO user connection comprises defining an encryption protocol for the IO user connection.

4. The method of claim 1, wherein an establishing of the IO user connection comprises the given processor-based IO user and the storage array sharing one or more of: (i) the one or more keys and (ii) a shared secret for generation of the one or more keys.

5. The method of claim 1, wherein the at least the portion of the IO user context information is transmitted in an unencrypted form.

6. The method of claim 1, wherein the given processor-based IO user comprises one or more of an application, an application acting on behalf of another user, an operating system of the host device, at least one processing device and a virtualized computing resource.

7. The method of claim 1, wherein the given processor-based IO user comprises an application and wherein one or more wrapper libraries perform one or more of a decryption function for read operations and an encryption function for write operations of the application over the established IO user connection.

8. The method of claim 1, further comprising initiating a rotation of the one or more keys.

9. The method of claim 1, further comprising the given processor-based IO user sending at least one read request to the storage array, wherein the storage array: (i) encrypts a payload of a read response to the at least one read request using an encryption key for the established IO user connection, and (ii) sends the encrypted payload and at least a portion of the IO user context information over the established IO user connection to the given processor-based IO user, and wherein the given processor-based IO user decrypts the encrypted payload using a decryption key for the established IO user connection.

10. The method of claim 1, further comprising the given processor-based IO user sending at least one write operation to the storage array, wherein the given processor-based IO user: (i) encrypts a payload of the at least one write operation using an encryption key for the established IO user connection, and (ii) sends the encrypted payload and at least a portion of the IO user context information over the established IO user connection to the storage array, and wherein the storage array decrypts the encrypted payload using a decryption key for the established IO user connection and stores the decrypted payload.

11. The method of claim 1, further comprising controlling a flow of the given IO operation over the established IO user connection using an out-of-band control path, for the given processor-based IO user, between the host device and at least one controller of the storage array.

12. The method of claim 1, wherein one or more of (i) a shared secret for generating one or more of at least one encryption key and at least one decryption key for the established IO user connection; and (ii) one or more of at least one encryption key and at least one decryption key for the established IO user connection are shared using an out-of-band control path, for the given processor-based IO user, between the host device and at least one controller of the storage array.

13. An apparatus comprising:
at least one processing device comprising a processor coupled to a memory;
the at least one processing device being configured to implement the following steps:
obtaining IO (input/output) user context information associated with an established IO user connection, of a plurality of established IO user connections, between a given processor-based IO user, of a plurality of processor-based IO users, and at least a portion of at least one storage volume on a storage array, wherein the IO user context information comprises one or more keys for the established IO user connection, wherein a host device is associated with the plurality of processor-based IO users, wherein at least two of the plurality of processor-based IO users are associated with different ones of the plurality of established IO user connections between a respective processor-based IO user and the at least the portion of the at least one respective storage volume for the respective processor-based IO user;

encrypting a payload of a given IO operation from the given processor-based IO user using at least one of the one or more keys; and transmitting the encrypted payload and at least a portion of the IO user context information over the established IO user connection for the given processor-based IO user, wherein one or more of the given processor-based IO user and the storage array decrypt the encrypted payload using at least one of the one or more keys, wherein the given IO operation is encrypted on the established IO user connection for the given processor-based IO user between the host device and the storage array.

14. The apparatus of claim 13, further comprising initiating a rotation of the one or more keys.

15. The apparatus of claim 13, further comprising the given processor-based IO user sending at least one read request to the storage array, wherein the storage array: (i) encrypts a payload of a read response to the at least one read request using an encryption key for the established IO user connection, and (ii) sends the encrypted payload and at least a portion of the IO user context information over the established IO user connection to the given processor-based IO user, and wherein the given processor-based IO user decrypts the encrypted payload using a decryption key for the established IO user connection.

16. The apparatus of claim 13, further comprising the given processor-based IO user sending at least one write operation to the storage array, wherein the given processor-based IO user: (i) encrypts a payload of the at least one write operation using an encryption key for the established IO user connection, and (ii) sends the encrypted payload and at least a portion of the IO user context information over the established IO user connection to the storage array, and wherein the storage array decrypts the encrypted payload using a decryption key for the established IO user connection and stores the decrypted payload.

17. A non-transitory processor-readable storage medium having stored therein program code of one or more software programs, wherein the program code when executed by at least one processing device causes the at least one processing device to perform the following steps:

obtaining IO (input/output) user context information associated with an established IO user connection, of a plurality of established IO user connections, between a given processor-based IO user, of a plurality of processor-based IO users, and at least a portion of at least one storage volume on a storage array, wherein the IO user context information comprises one or more keys for the established IO user connection, wherein a host device is associated with the plurality of processor-based IO users, wherein at least two of the plurality of processor-based IO users are associated with different ones of the plurality of established IO user connections between a respective processor-based IO user and the at least the portion of the at least one respective storage volume for the respective processor-based IO user;

encrypting a payload of a given IO operation from the given processor-based IO user using at least one of the one or more keys; and transmitting the encrypted payload and at least a portion of the IO user context information over the established IO user connection for the given processor-based IO user, wherein one or more of the given processor-based IO user and the storage array decrypt the encrypted payload using at least one of the one or more keys, wherein the given IO operation is encrypted on the established IO user connection for the given processor-based IO user between the host device and the storage array.

18. The non-transitory processor-readable storage medium of claim 17, further comprising initiating a rotation of the one or more keys.

19. The non-transitory processor-readable storage medium of claim 17, further comprising the given processor-based IO user sending at least one read request to the storage array, wherein the storage array: (i) encrypts a payload of a read response to the at least one read request using an encryption key for the established IO user connection, and (ii) sends the encrypted payload and at least a portion of the IO user context information over the established IO user connection to the given processor-based IO user, and wherein the given processor-based IO user decrypts the encrypted payload using a decryption key for the established IO user connection.

20. The non-transitory processor-readable storage medium of claim 17, further comprising the given processor-based IO user sending at least one write operation to the storage array, wherein the given processor-based IO user: (i) encrypts a payload of the at least one write operation using an encryption key for the established IO user connection, and (ii) sends the encrypted payload and at least a portion of the IO user context information over the established IO user connection to the storage array, and wherein the storage array decrypts the encrypted payload using a decryption key for the established IO user connection and stores the decrypted payload.

* * * * *